(12) United States Patent
Zimberoff et al.

(10) Patent No.: US 11,227,252 B1
(45) Date of Patent: Jan. 18, 2022

(54) TOKEN-BASED TRANSPORT RULES

(71) Applicant: The Descartes Systems Group Inc., Waterloo (CA)

(72) Inventors: Rafael Zimberoff, Seattle, WA (US); Aliaksandr Hramadski, Factoria, WA (US); Alexander Uslontsev, Seattle, WA (US); Patricia Anderson, Seattle, WA (US); Stanislav Tugushev, Seattle, WA (US)

(73) Assignee: The Descartes Systems Group Inc., Waterloo (CA)

( * ) Notice: Subject to any disclaimer, the term of this patent is extended or adjusted under 35 U.S.C. 154(b) by 299 days.

(21) Appl. No.: 16/147,360

(22) Filed: Sep. 28, 2018

(51) Int. Cl.
*G06Q 10/08* (2012.01)

(52) U.S. Cl.
CPC .................................. *G06Q 10/083* (2013.01)

(58) Field of Classification Search
CPC .... G06Q 10/083; G06Q 20/12; G06Q 20/385; G06Q 20/40; G06Q 20/401; G06Q 20/405; G06Q 20/3226; G06Q 20/36; G06Q 10/08; G06Q 20/065; G06Q 20/3274
See application file for complete search history.

(56) References Cited

U.S. PATENT DOCUMENTS

| | | |
|---|---|---|
| 5,038,283 A | 8/1991 | Caveney |
| 5,153,842 A | 10/1992 | Dlugos, Sr. et al. |
| 5,684,951 A | 11/1997 | Goldman et al. |
| 5,804,803 A | 9/1998 | Cragun et al. |
| 5,869,819 A | 2/1999 | Knowles et al. |
| 5,956,483 A | 9/1999 | Grate et al. |
| 5,971,277 A | 10/1999 | Cragun et al. |

(Continued)

FOREIGN PATENT DOCUMENTS

| | | |
|---|---|---|
| AU | 2007254694 B2 | 1/2008 |
| GB | 2460683 A | 12/2009 |

(Continued)

OTHER PUBLICATIONS

CargoCoin White Paper (Jun. 28, 2018), Revolutionizing the global trade and transport by decentralization, retrieved at https://thecargocoin.com/docs/CargoCoin-Whitepaper.pdf.*

(Continued)

*Primary Examiner* — Peter Ludwig
(74) *Attorney, Agent, or Firm* — Ellen M. Bierman; Lowe Graham Jones PLLC

(57) ABSTRACT

Techniques for token-based control of item transport operations are described. In some examples, a Transport Rules Broker ("TRB") receives a selection of transport rules associated with a user. The transport rules control operations that are performed by a carrier when the carrier transports an item from, for, or to the user. The TRB generates a token that is associated with the transport rules and/or the user. In a typical scenario, the user provides the token to a merchant computing system when ordering an item. Having received the token, the merchant computing system provides it (directly or indirectly) to the carrier computing system. The token controls operations that are performed by the carrier when the carrier transports the item to the user or other destination. In particular, the token causes the carrier to transport the item in accordance with the selected rules that are associated with the token.

20 Claims, 9 Drawing Sheets

(56) References Cited

U.S. PATENT DOCUMENTS

| | | |
|---|---|---|
| 5,992,752 A | 11/1999 | Wilz, Sr. et al. |
| 6,016,516 A | 1/2000 | Horikiri |
| 6,220,509 B1 | 4/2001 | Byford |
| 6,259,367 B1 | 7/2001 | Klein |
| 6,292,709 B1 | 9/2001 | Uhl et al. |
| 6,321,992 B1 * | 11/2001 | Knowles ............... G06Q 10/08 235/462.01 |
| 6,360,254 B1 | 3/2002 | Linden et al. |
| 6,394,354 B1 | 5/2002 | Wilz, Sr. et al. |
| 6,539,360 B1 | 3/2003 | Kadaba |
| 6,542,927 B2 | 4/2003 | Rhoads |
| 6,778,544 B1 | 8/2004 | Holiday |
| 6,827,273 B2 | 12/2004 | Wilz et al. |
| 6,850,986 B1 | 2/2005 | Peacock |
| 6,961,750 B1 | 11/2005 | Burd et al. |
| 6,964,374 B1 | 11/2005 | Djuknic et al. |
| 7,076,449 B2 | 7/2006 | Tsunenari et al. |
| 7,117,227 B2 | 10/2006 | Call |
| 7,184,973 B2 | 2/2007 | Monteleone et al. |
| 7,191,158 B2 | 3/2007 | Ogg et al. |
| 7,225,400 B2 | 5/2007 | Beezer et al. |
| 7,266,513 B2 | 9/2007 | Chalmers et al. |
| 7,267,273 B2 | 9/2007 | Silverbrook et al. |
| 7,409,353 B1 | 8/2008 | Uslontsev et al. |
| 7,415,524 B2 | 8/2008 | Burd et al. |
| 7,590,563 B1 | 9/2009 | Ward et al. |
| 7,590,564 B1 | 9/2009 | Ward et al. |
| 7,606,857 B2 | 10/2009 | Friedman et al. |
| 7,620,583 B2 | 11/2009 | Sundel |
| 7,624,025 B2 | 11/2009 | Uslontsev et al. |
| 7,641,104 B1 | 1/2010 | Leonetai. |
| 7,647,249 B2 | 1/2010 | Shroff et al. |
| 7,660,721 B2 | 2/2010 | Williams et al. |
| 7,664,651 B1 | 2/2010 | Bennett et al. |
| 7,918,402 B2 | 4/2011 | Conlon et al. |
| 7,991,871 B2 | 8/2011 | Son et al. |
| 8,027,882 B2 | 9/2011 | Shroff et al. |
| 8,126,821 B2 | 2/2012 | Uslontsev et al. |
| 8,185,479 B2 | 5/2012 | Zimberoff et al. |
| 8,521,656 B2 | 8/2013 | Zimberoff et al. |
| 8,527,429 B2 | 9/2013 | Zimberoff et al. |
| 8,554,694 B1 | 10/2013 | Ward et al. |
| 8,805,747 B2 | 8/2014 | Zimberoff et al. |
| 8,812,409 B2 | 8/2014 | Zimberoff et al. |
| 8,818,912 B2 | 8/2014 | Uslontsev et al. |
| 9,646,281 B2 | 5/2017 | Zimberoff et al. |
| 9,774,452 B2 | 9/2017 | Bjarnason et al. |
| 10,148,656 B2 | 12/2018 | Zimberoff et al. |
| 10,713,634 B1 * | 7/2020 | McBride ............... G06Q 20/204 |
| 2001/0005848 A1 | 6/2001 | Haverstock et al. |
| 2002/0010689 A1 | 1/2002 | Tibbs et al. |
| 2002/0013744 A1 | 1/2002 | Tsunenari et al. |
| 2002/0019759 A1 | 2/2002 | Arunapuram et al. |
| 2002/0032573 A1 | 3/2002 | Williams et al. |
| 2002/0032612 A1 | 3/2002 | Williams et al. |
| 2002/0038255 A1 | 3/2002 | Tarvydas et al. |
| 2002/0046130 A1 | 4/2002 | Monteleone et al. |
| 2002/0087548 A1 | 7/2002 | Tasalloti |
| 2002/0107772 A1 | 8/2002 | Jain et al. |
| 2002/0133434 A1 | 9/2002 | Nevel et al. |
| 2002/0135802 A1 | 9/2002 | Perez et al. |
| 2002/0158137 A1 | 10/2002 | Grey et al. |
| 2002/0165931 A1 | 11/2002 | Greer et al. |
| 2002/0193225 A1 | 12/2002 | Raming |
| 2003/0004830 A1 | 1/2003 | Frederick |
| 2003/0026620 A1 | 2/2003 | Gallivan |
| 2003/0101148 A1 | 5/2003 | Montgomery et al. |
| 2003/0139975 A1 | 7/2003 | Perkowski |
| 2003/0217018 A1 | 11/2003 | Groff et al. |
| 2004/0006693 A1 | 1/2004 | Vasnani et al. |
| 2004/0133678 A1 | 7/2004 | Tamura |
| 2004/0153425 A1 | 8/2004 | Dillard et al. |
| 2004/0177114 A1 | 9/2004 | Friedman et al. |
| 2004/0203636 A1 | 10/2004 | Chan et al. |
| 2004/0215480 A1 | 10/2004 | Kadaba |
| 2004/0220845 A1 | 11/2004 | Malapitan |
| 2004/0249764 A1 | 12/2004 | Delitz et al. |
| 2005/0021856 A1 | 1/2005 | Basile et al. |
| 2005/0038758 A1 | 2/2005 | Hilbush et al. |
| 2005/0060165 A1 | 3/2005 | Knight et al. |
| 2005/0071244 A1 | 3/2005 | Phillips et al. |
| 2005/0114221 A1 | 5/2005 | Walters et al. |
| 2005/0114222 A1 * | 5/2005 | Mundy ............... G06Q 30/06 705/26.1 |
| 2005/0130638 A1 | 6/2005 | Schrader |
| 2005/0133585 A1 | 6/2005 | Nakamura |
| 2005/0137937 A1 | 6/2005 | Njo et al. |
| 2005/0138469 A1 | 6/2005 | Ryan, Jr. et al. |
| 2005/0154923 A1 | 7/2005 | Lok et al. |
| 2005/0171791 A1 | 8/2005 | Chimenti et al. |
| 2005/0197892 A1 * | 9/2005 | Bilibin ............... G06Q 10/025 705/13 |
| 2006/0004910 A1 | 1/2006 | Burd et al. |
| 2006/0011716 A1 | 1/2006 | Perkowski |
| 2006/0020366 A1 | 1/2006 | Bloom |
| 2006/0149577 A1 | 7/2006 | Stashluk, Jr. et al. |
| 2006/0168074 A1 | 7/2006 | Gardner et al. |
| 2006/0168644 A1 | 7/2006 | Richter et al. |
| 2006/0173749 A1 | 8/2006 | Ward et al. |
| 2006/0184640 A1 | 8/2006 | Hatch |
| 2006/0195364 A1 | 8/2006 | Shroff et al. |
| 2006/0242026 A1 | 10/2006 | Crespo et al. |
| 2006/0282271 A1 | 12/2006 | Ananda et al. |
| 2006/0294196 A1 | 12/2006 | Feirouz et al. |
| 2007/0055639 A1 | 3/2007 | Garvey et al. |
| 2007/0100967 A1 | 5/2007 | Smith et al. |
| 2007/0109266 A1 | 5/2007 | Davis et al. |
| 2007/0124414 A1 | 5/2007 | Beddingfield, Sr. et al. |
| 2007/0162954 A1 | 7/2007 | Pela |
| 2007/0162967 A1 | 7/2007 | de Jong et al. |
| 2007/0174213 A1 | 7/2007 | Whitehouse et al. |
| 2007/0192191 A1 | 8/2007 | Neal et al. |
| 2007/0299791 A1 | 12/2007 | Mack |
| 2008/0004967 A1 | 1/2008 | Gillen |
| 2008/0017722 A1 | 1/2008 | Snyder et al. |
| 2008/0114782 A1 | 5/2008 | Sandovsky et al. |
| 2008/0133659 A1 | 6/2008 | Aldrey et al. |
| 2008/0162304 A1 | 7/2008 | Ourega |
| 2008/0183326 A1 | 7/2008 | Danelski |
| 2008/0189214 A1 | 8/2008 | Mueller et al. |
| 2008/0292137 A1 | 11/2008 | Rhoads |
| 2008/0319859 A1 | 12/2008 | Rhoads |
| 2009/0048953 A1 | 2/2009 | Hazel et al. |
| 2009/0060199 A1 | 3/2009 | von Mueller et al. |
| 2009/0070583 A1 | 3/2009 | von Mueller et al. |
| 2009/0076967 A1 * | 3/2009 | Fields ............... G06Q 20/3821 705/76 |
| 2009/0146410 A1 | 6/2009 | Uslontsev et al. |
| 2009/0177739 A1 | 7/2009 | Uslontsev et al. |
| 2009/0234694 A1 | 9/2009 | Uslontsev et al. |
| 2009/0271250 A1 | 10/2009 | Sriver et al. |
| 2010/0141779 A1 | 6/2010 | Rhoads |
| 2010/0150395 A1 | 6/2010 | Davis et al. |
| 2010/0179685 A1 * | 7/2010 | Meyer ............... G06Q 10/08 700/227 |
| 2010/0185522 A1 | 7/2010 | Ouchi |
| 2010/0268659 A1 | 10/2010 | Zimberoff et al. |
| 2010/0327054 A1 * | 12/2010 | Hammad ............... G06Q 20/12 235/375 |
| 2010/0332284 A1 | 12/2010 | Hilbush et al. |
| 2011/0071921 A1 | 3/2011 | Crespo et al. |
| 2011/0082747 A1 | 4/2011 | Khan et al. |
| 2011/0320320 A1 | 12/2011 | Dearlove et al. |
| 2012/0005105 A1 | 1/2012 | Beier et al. |
| 2012/0039469 A1 | 2/2012 | Mueller et al. |
| 2012/0084222 A1 | 4/2012 | Zimberoff et al. |
| 2012/0089529 A1 | 4/2012 | Uslontsev et al. |
| 2012/0209749 A1 * | 8/2012 | Hammad ............... G06Q 20/204 705/27.1 |
| 2012/0233085 A1 | 9/2012 | Zimberoff et al. |
| 2012/0330844 A1 | 12/2012 | Kaufman |
| 2013/0056533 A1 | 3/2013 | Zimberoff et al. |
| 2013/0061337 A1 * | 3/2013 | Zimberoff ............... G06Q 50/28 726/30 |

(56) References Cited

U.S. PATENT DOCUMENTS

| | | | |
|---|---|---|---|
| 2013/0117138 A1 | 5/2013 | Hazel et al. | |
| 2013/0317999 A1 | 11/2013 | Zimberoff et al. | |
| 2013/0318001 A1 | 11/2013 | Zimberoff et al. | |
| 2014/0324724 A1 | 10/2014 | Zimberoff et al. | |
| 2014/0330735 A1 | 11/2014 | Uslontsev et al. | |
| 2014/0344580 A1 | 11/2014 | von Mueller et al. | |
| 2014/0365375 A1 | 12/2014 | von Mueller et al. | |
| 2016/0019536 A1 | 1/2016 | Ortiz et al. | |
| 2016/0071095 A1* | 3/2016 | Foerster | G06Q 20/20 705/65 |
| 2016/0078397 A1* | 3/2016 | Barton | G06Q 20/382 705/67 |
| 2016/0239836 A1 | 8/2016 | von Mueller et al. | |
| 2017/0091699 A1* | 3/2017 | Mueller | H04L 67/18 |
| 2017/0228685 A1 | 8/2017 | Zimberoff et al. | |
| 2018/0211202 A1* | 7/2018 | Ynion, Jr. | G06Q 20/12 |
| 2018/0240067 A1* | 8/2018 | Oz | H04W 12/08 |
| 2019/0012637 A1* | 1/2019 | Gillen | H04L 9/0637 |
| 2019/0043010 A1* | 2/2019 | Smith | H04L 9/0833 |
| 2019/0378364 A1* | 12/2019 | Drako | H04W 12/61 |
| 2019/0392450 A1* | 12/2019 | Gosset | G06Q 20/401 |
| 2020/0059360 A1* | 2/2020 | Martynov | H04L 63/0807 |

FOREIGN PATENT DOCUMENTS

| | | |
|---|---|---|
| JP | 11328076 A | 11/1999 |
| JP | 2007304652 A | 11/2007 |

OTHER PUBLICATIONS

ShipNext White Paper (Apr. 2018). blockchain driven freight shipment and logistics ecosystem, retrieved at http://escinst.org/wp-content/uploads/2018/05/SHIPNEXT-White-Paper.pdf.*

Phoon, Michelle, "FedEx Updates PC Interface," Newsbytes News Network, Washingtonpost Newsweek Interactive, Jun. 18, 1998, 2 pages.

"Advanced Data Management and Personalization Features Highlight Firstlogic's New Version of Postalsoft(R) Business Edition(TM); Powerful List Processing Capabilities Come Standard With Easy-to-Use Mailing Solution," PR Newswire Association LLC, Feb. 26, 2004, retrieved from the Internet at http://dialog.proquest.com/professional/printviewfile?accountid=142257 on Jan. 21, 2017, 2 pages.

"RedRoller, Inc. Launches the 'Best Way to Ship'; The Nation's First and Only Free Web-Based, On-Demand Shipping Solution Can Save 25 to 50 Percent on Annual Shipping Costs," PR Newswire, New York, Jun. 21, 2006, retrieved from the Internet via http://search.proquest.com/printviewfile?accountid=14753 on Apr. 4, 2013, 3 pages.

Wikipedia, "URL Redirection," www.wikipedia.org, version of Wikipedia article dated Nov. 28, 2006.

Business Wire, "UPS and Yahoo! Offer Integrated Shipping Tools," New York, May 3, 2004, 1.

Microsoft Press; Microsoft Computer Dictionary Third Edition, 1997; pp. 178 and 426-427; 5 pages.

Merriam-Webster, Incorporated, Merriam-Webster's Collegiate Dictionary Eleventh Edition, 2007; pp. 416 and 1125; 4 pages.

www.merriam-webster.com/dictionary/enter; Online definition of "enter"; Printed Feb. 13, 2012; 4 pages.

www.merriam-webster.com/dictionary/select; Online definition of "select" printed Feb. 13, 2012; 3 pages.

Korpela, "Newsgroup Link Tag, How To?", Google Groups, USENET post, alt.html, Jul. 10, 1998.

Clark, "Building a Better Supply," Chain Store Age 78(2): 65-66, 2002.

Hoffman et al., "The Mailto URL Scheme", RFC2368, The Internet Society, 1998, URL=http://www.ietf.org/rfc2368, download date Mar. 24, 2008.

Hoffman, "The Telnet URI Scheme", RFC 4248, The Internet Society, 2005, URL=http://www.ietf.org/rfc/rfc4248, download date Mar. 24, 2008.

Manister, "Guidelines for new URL Schemes", RFC 2718, The Internet Society, 1999, URL=http://www.ietf.org/rfc/rfc2718, download date Mar. 24, 2008.

Obasanjo, "The Feed URI Scheme (Pre-Draft)", Network Working Group, Dec. 2003, URL=http://www.25hoursaday.com/draft-obasanjo-feed-URI-scheme-02.html, download date Mar. 24, 2008.

Registry of URI Schemes, Internet Assigned Numbers Authority, 2006, URL=http://www.iana.org/assignments/uri-schemes.html, download date Oct. 8, 2007.

"FedEx Shipping Labels:-ShipRush for FedEx Shippers", URL=http://zfirm.com/products/shiprush_fedex.shtml, download date Dec. 6, 2007.

ShipRush Product Documentation Excerpts, URL-http://www.zfirm.com/Product_Documentation/ShipRush/_v5-0_FedEx/, download date, Dec. 4, 2007.

"ShipRush Product Screen Display", Screen shot from running product.

Vigralek, et al., "A Transparent Replication of HTTP Service", 15th International Conference on Data Engineering Proceedings, Mar. 23-26, 1999, p. 97.

Wikipedia, "URL Redirection", Nov. 28, 2006.

Gammon, Ralph et al. "Toward the Digital Mailroom," Transform Magazine, Jun. 2004, pp. 28-35.

"RedRoller, Inc. Launches the 'Best Way to Ship': The Nation's First and Only Free Web-Based, On-Demand Shipping Solution Can Save 25 to 50 Percent on Annual Shipping Costs," PR Newswire, Jun. 21, 2006, 3 pages.

Forger, Gary, "Bar Codes, RFDC Double Warehouse Throughout, Stop Shipping Errors," Modem Materials Handling/Scan Tech News, Aug. 1996, pp. S-10 through S-11.

Logistics Management & Distribution Report, "Keeping tabs," 37 n9: p97(2), Peerless Media, LLC (Sep. 1998).

* cited by examiner

Fig. 2A

Transport Rules Selection

Home Address

Sam Jones
120 Lakeside Ave. Suite 100
Seattle, WA 98122

*202*

Rules

☒ Hold at Location

☐ Location address provided as ship to address
☒ Look up location nearest the provided address
☐ Select location on map
☐ Vehicle [options]

☐ Appointment: | 19:00 | Monday |

☐ Require Signature

☐ Require Recipient Token

☒ Require Delivery Token

*204*

Token Options (copy-and-paste into address form):

Identity token:   84c1cdf76b20255c6411   ~208a
Direct token:     HALRTD   ~208b
Name token:       Sam Jones cc5bf212320bfb   ~208c
Address token:    12348895 Easy Street   ~208d

Select Shipping Options

Step 1: Enter or Verify Your Shipping Destination:

Ship to Home

| | |
|---|---|
| Name | Sam Jones |
| Address1 | 120 Lakeside Ave. Suite 100 |
| Address2 | 84c1cdf76b20255c6411 |
| City | Seattle |
| State | WA     ZIP  98122 |

Step 2: Select a Shipping Method:

| Item | Shipping Method | Estimated Arrival Date |
|---|---|---|
| ACME Computer Co. Smart Phone Model XYZ $249.00 Qty: 1 | ○ Site to Store | Tue 7/26 to Mon 8/1 |
| | ○ Standard Shipping | Thu 7/21 to Tue 7/26 |
| | ◉ 2- to 3-Day Shipping | Thu 7/21 to Mon 7/25 |
| | ○ 1-Day Shipping | Wed 7/20 to Thu 7/21 |

| | |
|---|---|
| Item Total: | $249.00 |
| Shipping Cost: | $0.97 |
| Subtotal: | $249.97 |

( Edit Order )   ( Continue )

Fig. 3B

3B00: The process of 3A00, further comprising:

3B01: Receiving from multiple distinct carriers indications of transport operations that can be performed by each carrier

3B02: Presenting multiple transport rules to the user, wherein each transport rule corresponds to a transport operation that can be performed by one of the carriers

3B03: Receiving from the user a selection of one or more of the multiple transport rules

3B04: Storing the selected transport rules in association with the user and the generated token

Fig. 3C

3C00: The process of 3A00, wherein the providing the token to the user includes:

3C01: Causing the user to input the token via an address field of the input control, wherein the token includes a valid address that is not the destination address of the item

Fig. 3D

3D00: The process of 3A00, further comprising:

3D01: Enforcing the rule by receiving an indication that the rule has been executed by receiving the token along with a data item required by the rule

Fig. 3E

3E00: The process of 3A00, further comprising:

3E01: Receiving from a mobile device an indication that the token has been presented to a party to the transport of the item 3E02: Transmitting to the mobile device an indication that the token is authentic

Fig. 3F

3F00: The process of 3E00, further comprising:

3F01: Receiving from the mobile device an identifier of the user

3F02: Transmitting to the mobile device an indication that the token is associated with the user

TOKEN-BASED TRANSPORT RULES

TECHNICAL FIELD

The present disclosure relates to methods, techniques, and systems for token-based transport rules and, more particularly, to methods, techniques, and systems for utilizing tokens to control operations performed by a carrier when transporting an item from one location to another.

BACKGROUND

Completing an electronic commerce transaction requires the coordination of many different computing systems. Initially, when a buyer purchases an item, the buyer uses a client computing device to interact with a user interface provided by a merchant computing system. As part of the transaction, the buyer provides a destination shipping address to the merchant computing system. The merchant computing system then typically communicates the order data, shipping address, and the like to one or more fulfillment computing systems. A typical warehouse or fulfillment center may include multiple distinct fulfillment computing systems, including inventory systems (e.g., responsible for managing and tracking inventory levels), shipping systems (e.g., responsible for logging shipments, preparing mailing labels, etc.), tracking systems (e.g., responsible for tracking shipments as they leave the fulfilment center), and the like. In a typical scenario, the destination address is then communicated directly or indirectly to a shipping computing system, which is responsible for printing a shipping label and possibly further communicating the address to a carrier computing system. Different carriers (e.g., FedEx, UPS, the Postal Service) operate distinct carrier computing systems, utilizing a diversity of interfaces. During shipment, the carrier computing system may transmit status data to a client device or system operated by the recipient of the order.

The sheer quantity and diversity of computing systems involved in completing an electronic commerce transaction poses a number of technical challenges. First and foremost, it is technically difficult to integrate the computing systems so that they may communicate and/or access functions provided by other systems. For example, as different carriers innovate to provide new capabilities for transporting and delivering items (e.g., bulk shipments, custom delivery times, appointment based delivery), it becomes increasingly difficult for merchant computing systems to make those capabilities available to the end user. If each of the major carriers provides a different set of capabilities, each of dozens of not hundreds of different types of merchant computing systems must be modified to surface those capabilities to the user (e.g., by providing access via an order-taking interface). Similarly, intermediate warehouse or shipping systems need to be modified to process and implement the carriers' capabilities.

A secondary technical problem relates to associating carrier capabilities with users. A given user may have a preferred carrier and/or specific transport or delivery options. Data representing these preferences is currently stored across many different systems, including many distinct merchant computing systems and possibly various carrier systems. Any change to a user's preferences must be propagated throughout many different data storage systems, frequently by way of manual update.

BRIEF DESCRIPTION OF THE DRAWINGS

FIGS. 2A and 2B are block diagrams that illustrate user interface and interaction aspects according to example embodiments.

FIGS. 3A-3G are example flow diagrams of processes performed by example embodiments.

DETAILED DESCRIPTION

Figure 1A:
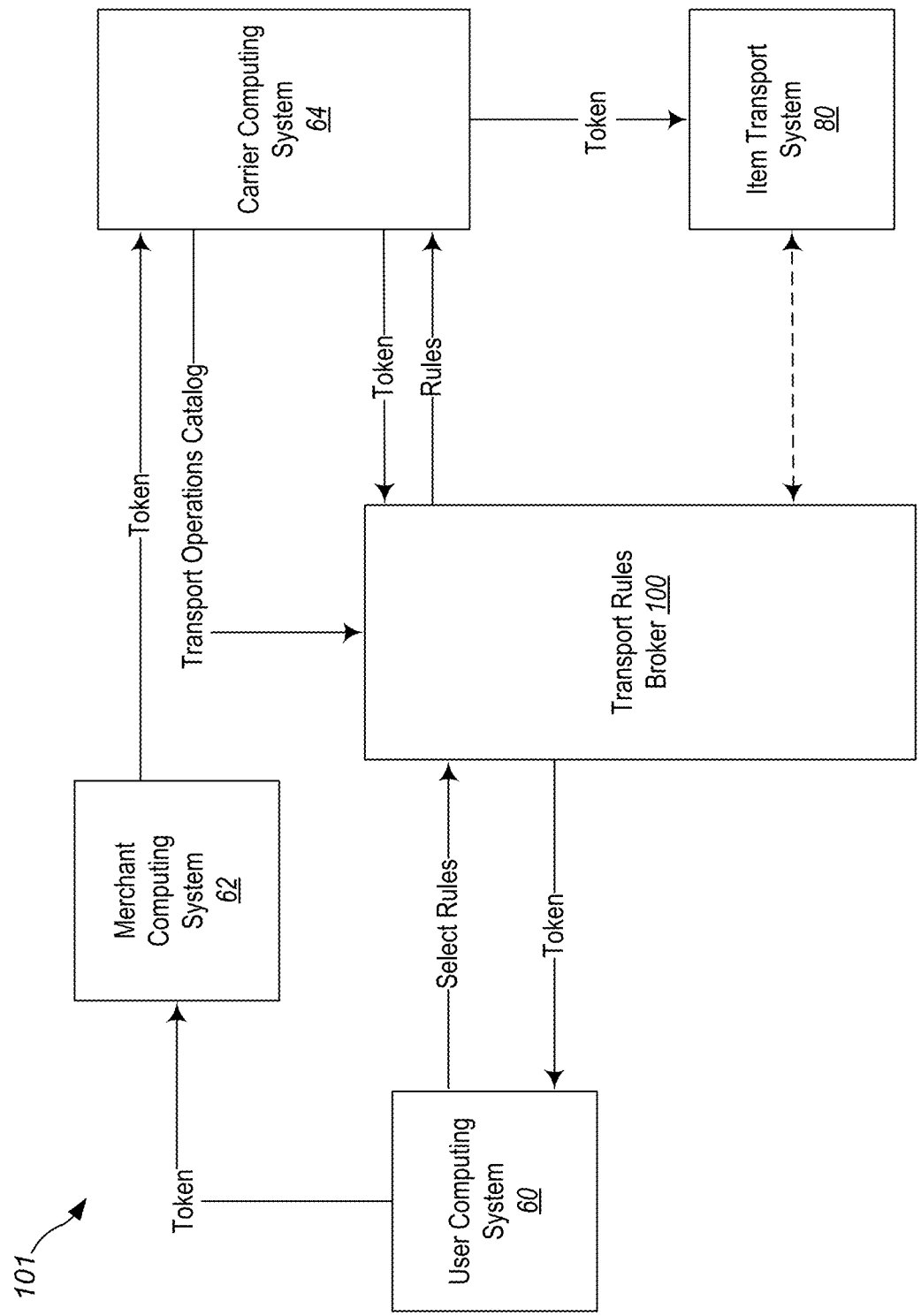
FIG. 1A is a block diagram that depicts a transport rules broker according to an example embodiment.

Embodiments described herein provide enhanced computer- and network-based methods, techniques, and systems for token-based control of operations performed by a carrier when transporting an item from one location to another. Example embodiments provide a Transport Rules Broker ("TRB") that is configured to receive a selection of transport rules associated with a user. The transport rules control operations that are performed by a carrier when the carrier transports an item from, for, or to the user. The operations may include any functions or features performed by the carrier, such as shipping service (e.g., next day, two-day, freight), hold at location, delivery to alternate location (e.g., neighbor, automobile, delivery locker), delivery time (e.g., after 5 PM), or the like.

The TRB is further configured to generate a token that is associated with the transport rules. In some embodiments, the token is also uniquely associated with the user. The token is provided to a merchant computing system, which in turn provides the token to a carrier computing system. Typically, the token is provided by the user to the merchant computing system via an input control, such as a form that includes multiple fields for entering address data. For example, if the user is ordering an item from the merchant, the user may enter the token into one of the street address fields in an order form. Having received the token, the merchant computing system provides it (directly or indirectly) to a carrier computing system. For example, the merchant may create a shipping label that includes the token. As the item is passed to the carrier, the label is scanned in order to ingest the token into the carrier computing system. In other examples, the merchant computing system may transmit the token (along with other address data) to the carrier computing system.

The token controls operations that are performed by the carrier when the carrier transports an item. In particular, the token causes the carrier to transport the item in accordance with the selected rules that are associated with the token. As noted, above, the rules control operations such as delivery service, time of delivery, location holds, or the like. For example, if the user selects a rule that requires that a package be delivered to a hold location, the carrier will deliver the package to the specified hold location. As another example, the user may select a rule that requires that their token itself be presented upon delivery as a form of authentication. If such a rule is selected, the delivery agent must present the token at the time of delivery in order to satisfy the rule.

The described techniques address various existing technical problems. The described techniques address and improve existing technology, such as by improving the operation, integration, or efficiency of one or more computing systems. For example, the TRB provides a system architecture in which merchant and carrier systems operate independently of one another, which improves the interoperability of these systems. In some embodiments, the rules system implemented by the TRB provides for authentication that is linked to the transport of a particular item, which is a function not present in current transport systems. Specifically, rules can be selected that require the presentation or acceptance of a unique token at various stages of the transport process. The token can be used to prove not just the source of the item, but also the identity or at least the authenticity of a transport, delivery, or recipient agent. In addition, the rules can be standardized and extensible, allowing different uses and different user interfaces for token exchange to be implemented at future times or in other embodiments.

1. System Overview

FIG. 1A is a block diagram that illustrates a token-based transport rules system 101 according to an example embodiment. The system 101 includes a Transport Rules Broker 100, a user computing system 60, a merchant computing system 62, a carrier computing system 64, and an item transport system 80.

In the embodiment of FIG. 1A, the carrier computing system 64 specifies its transport operations to the broker 100. Specifying transport operations may include transmitting a catalog (e.g., list, database, table) of transport operations that can be performed by the carrier that operates the carrier computing system 64. Such operations may include delivery service type, location hold options, and the like. In some embodiments, the broker 100 is controlled by an entity that is different from the entity that controls the carrier computing system 64. In such embodiments, the broker 100 may receive transport operations catalogs from multiple distinct carrier systems. In other embodiments, the broker 100 is part of, or at least controlled by, the same entity that controls the carrier computing system 64 and the merchant computing system 62.

A user operates the user computing system 60 to interact with the broker 100. Such interactions include account creation, logon authentication, and selecting one or more transport rules that control operations performed by the carrier when transporting an item for or on behalf of the user. In some embodiments, the broker 100 provides a user interface (e.g., as a Web page) such as is described with respect to FIG. 2A, below. The user interface is configured to facilitate the selection of rules. The selected rules are stored by the broker 100 in association with an identifier of the user. In response to the selection of rules, the broker 100 transmits a token to the user computing system 60, where it can be stored for later use.

At a later time, the user operates the user computing system 60 to interact with the merchant computing system 62. The merchant computing system 62 may be a Web-based storefront, an order entry system (operated by a call center agent), or similar. After the user selects an item for purchase, the user computing system 60 transmits the token to the merchant computing system 62. The token can be received by the 62 in various ways. In one embodiment, the token is received by a user interface that is configured to receive shipping data (e.g., name, address, delivery service type). An example of such an interface is described below with reference to FIG. 2B. The token can be input into a field of the user interface including one used for an other purpose, such as a name field, street address field, or the like. In other embodiments, the token may be transmitted to the system 62 in a manner that is transparent to the user. For example, the token may be transmitted as part of a protocol for exchanging shipping data between two or more of the user computing system 60, merchant computing system 62, and/or carrier computing system 64.

The merchant computing system 62 next provides the token to the carrier computing system 64. The token is typically provided along with address data that controls the transport of the item to or for the user. This can be accomplished in various ways. In one embodiment, the merchant computing system 62 transports the token and address data over a network connection. In another embodiment, the merchant computing system 62 encodes the token and address data on a shipping label, the which is scanned or otherwise input into an intermediary device (e.g., a shipping scanner) that transmits the data to the carrier computing system 64.

The carrier computing system 64 then controls, based on the rules associated with the token, the item transport system 80 to transport the item from its source to its destination. The carrier computing system 64 may transmit the token to the broker 100 and receive in response the rules associated with the token. In other embodiments, at least some of the rules may be specified directly by the token itself. For example, the token may be a "direct token" that includes an identifier of a rule. A direct token may include one or more text characters that are mapped to specific rules, such as "HAL" identifying a hold-at-location rule. The rules are then used by the carrier computing system 64 to control item transport such as by directing the receipt, routing, carriage, and/or delivery of the item as it is conveyed from its source to its destination.

In at least some embodiments, the item transport system 80 (or elements thereof) may interact with the broker 100. Examples of such interactions are described next, with respect to FIG. 1B.

Figure 1B:
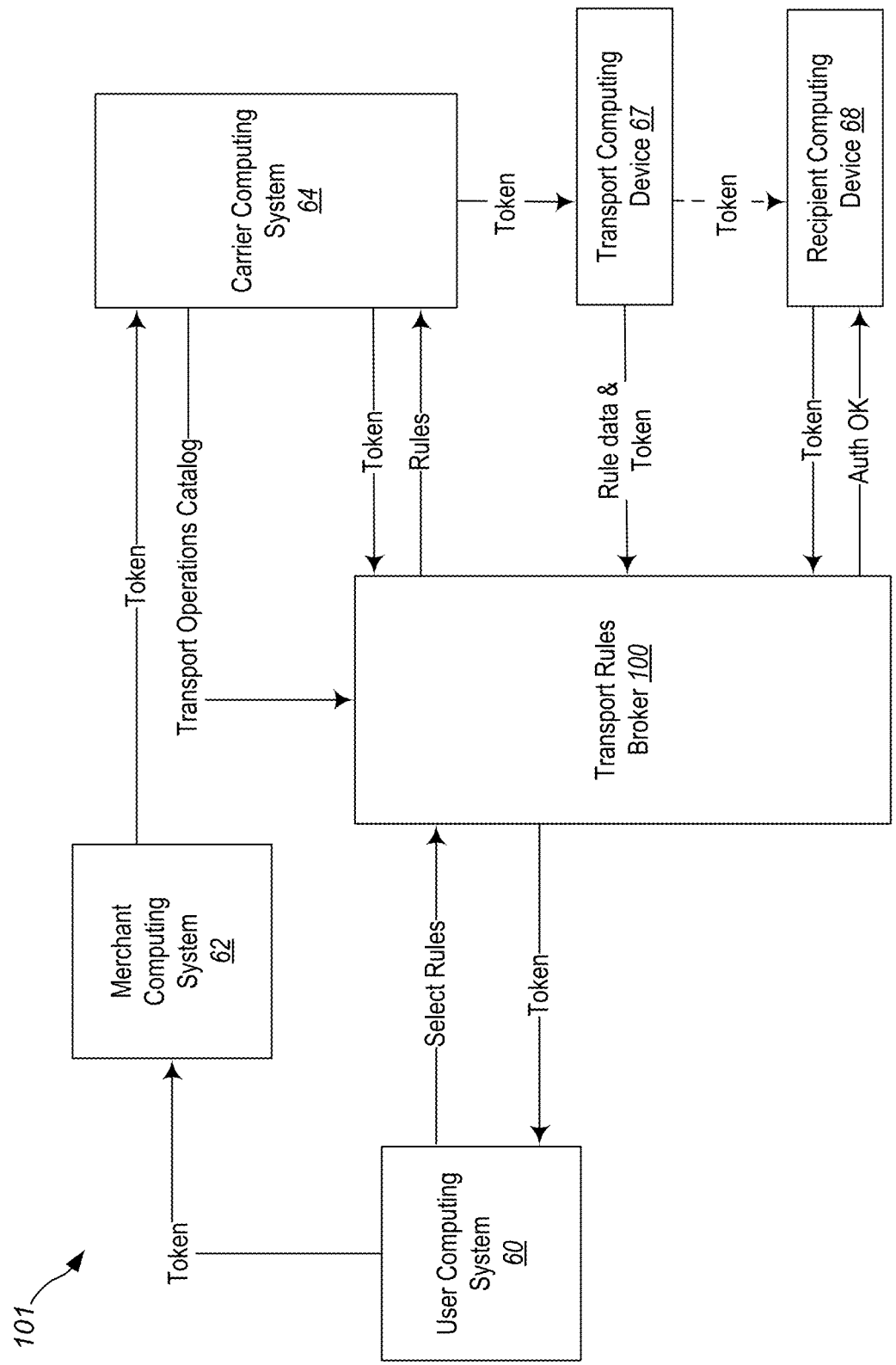
FIG. 1B is a block diagram that depicts interactions between transport rules broker and multiple carrier, transport, and recipient computing systems or devices according to an example embodiment.

FIG. 1B is a block diagram that depicts interactions between transport rules broker and multiple carrier, transport, and recipient computing systems or devices according to one embodiment. FIG. 1B illustrates the function and use of an example token in the context of the transport of an item to its destination. As in FIG. 1A, FIG. 1B illustrates a token-based transport rules system 101 that includes a Transport Rules Broker 100, a user computing system 60, a merchant computing system 62, and a carrier computing system 64. In addition, the system 101 here includes a transport computing device 67 and a recipient computing device 68.

In FIG. 1B, the carrier computing system 64 provides the token to a transport computing device 67. The device 67 may be a mobile device operated by a driver or other person or other entity involved in transporting the item. In other embodiments, the device 67 instead obtains the token by scanning it from a package, manual input, or the like.

In this example, the token is associated with one or more rules that require the device 67 to provide the token along with rule data to the broker 100. For example, the rule may require that the device 67 provide GPS location at one or more times during the transport process, so that the item can be tracked. As another example, the rule may require that the device 67 provide a time at which a specified event (e.g., pickup, drop off, dispatch) occurred. In each of these examples, the requested data (e.g., timestamp, GPS location) are provided by the device 67 to the broker 100. The broker 100 stores the received information so that it can be later accessed for various purposes, such as shipment tracking, evidence of delivery or receipt, or the like.

The recipient computing device 68 may also use the token in various ways. The recipient computing device 67 may be a smart phone or similar mobile device that is operated by a person associated with handling the item transport in some way, such as an employee at a shipping store or post office, a receptionist or other employee at the addressee's place of business, the addressee herself, or the like. In some examples, the token is associated with a rule that requires the delivery agent to present the token as a form of authentication. In such an example, the recipient computing device 68 receives the token, from the transport computing device 67, scanning the token from the shipping label, manual entry, or the like. The recipient computing device 67 then transmits the token to the broker 100. The broker 100 then responds with an indication of whether or not the token is authentic. In other embodiments, the recipient computing device 67 instead receives the token from the broker 100, and then locally compares it to the token from the shipping label in order to determine authenticity.

In some embodiments, the broker 100 enforces transport rules. Enforcing a transport rule may include tracking and recording the execution of the rule by the carrier. A rule will typically specify an action that needs to be taken, such as a particular delivery operation. A rule may also or instead specify a data item (referred to above as "rule data") that needs to be provided that can be used to verify that the rule has been executed. The data item may be, for example, a GPS location, a picture (e.g., of the recipient, of a package at the door of the recipient, securing a transport vehicle, etc.), a signature, a date or time, a signal or code received from a recipient's mobile device, or the like. When enforcing rules, the broker 100 records indications that the rules have been executed possibly along with data items that are to be collected in accordance with the rule. This recorded data forms a type of audit log that reflects the transport of an item in addition to various events associated therewith.

FIGS. 2A and 2B are block diagrams that illustrate user interface and interaction aspects according to example embodiments. In typical embodiments, the illustrated user interface screens are provided via Web browsers or other client code that render some combination of markup and scripting languages (e.g., HTML plus JavaScript). Other implementations are contemplated, including an application executing on a mobile device, a native user interface presented by an executable on a desktop or laptop computer, or the like.

FIG. 2A depicts a transport rules selection screen 200 according to one embodiment. The screen includes a default address input control 202, a rules selection input control 204, and a token display control 206. The user can input a default (e.g., home) address into the address input control 202. In some embodiments, other addresses can be input, such as work, neighbor, preferred drop box, or the like. In some embodiments, a map may be presented to allow for interactive specification of an address or location.

Next, the user can select one or more transport rules via the rules selection input control 204. The control 204 displays multiple rules and their related sub-options. In this example, the control 204 displays a hold at location rule, which instructs the carrier to hold or deliver an item to a selected location, such as work, neighbor, map selected address, vehicle, or the like. The control 204 further displays rules for appointment-based delivery, signature requirements, and token presentation (e.g., the recipient must present a token, the delivery agent must present a token). In some embodiments, multiple selection controls, each of which correspond to a different carrier, may be provided. Each selection control is customized to present the specific transport rules provided by the corresponding carrier. The transport rules selected by the user may in turn trigger additional "internal" rules that are not exposed to the user.

Once the user has selected their transport rules, the broker 100 generates one or more tokens, which are then displayed via that token display control 206. Each of the generated tokens includes data that identifies, directly or indirectly, the transport rules selected by the user. In this embodiment, four distinct token types are displayed: an identity token 208a, a direct token 208b, a name token 208c, and an address token 208d.

The identity token 208a is a code that identifies a specific user and their associated transport rules. The identity token is typically a unique identifier that can be used to look up (e.g., in a database) the rules associated with a particular user.

The direct token 208b is a code that directly identifies the transport rules selected by the user. In this example, the direct token 208b references a hold at location rule and a delivery token requirement rule. Note that the direct token 208b does not, in this example, identify the user in any way.

The name token 208c is a string that merges the name of the user ("Sam Jones") with a code that directly or indirectly identifies the set of rules selected by the user. Here, the code is an identifier that can be used to look up a given rule set in a database or other data storage system. In other embodiments, the code is akin to the direct token 208b discussed above.

The address token 208d is a string that includes a street address. The street address does not correspond to an actual physical location. Rather, the string can be used by the broker 100 to look up the set of rules selected by the current user. At the same time, the string is a "valid" address in that it has been registered in address verification databases, so that merchant and shipping computing systems will not characterize the address token 208d as an unknown address.

Tokens may be generated based information about the user and/or information about the user's rule preferences. Information about the user may include ID numbers (e.g., passports, driver license, license plates, Social Security number, tax identifier), secrets (e.g., passwords, private keys, family secrets), relationships (e.g., names of relatives), biometrics (e.g., fingerprints, iris scans), images (e.g., portrait of the user). In some embodiments a token may be a hash or other one-way function that uses one or more data items such as those described above as inputs.

FIG. 2B depicts a typical shipping options selection screen 220 presented by an online merchant, shipping software, or similar. The screen 220 includes an address input control 221 and a shipping method selection control 222. In this example, the user has input their token into a second address field (labeled "Address 2"). Conventional address input controls frequently include a second address line, to be used to specify an apartment or suite number or similar.

When the user confirms their entries to the screen 220, the data in the input control 221 is transmitted to a shipping computing system and/or to a carrier computing system. As described above, when the carrier computing system receives the token, the carrier computing system uses the token to determine the transport rules that will govern the transport and delivery of the item ordered by the user. The transport rules are determined based on the type of the token. In some cases, the token will literally and/or directly specify the transport rules, such as when the token is a "direct" token 208b (FIG. 2A). In other cases, the carrier computing system may transmit the token to a transport rule broker computing system, which in turn will look up the rules associated with the token.

2. Example Processes

FIGS. 3A-3G are example flow diagrams of processes performed by example embodiments.

Figure 3A:
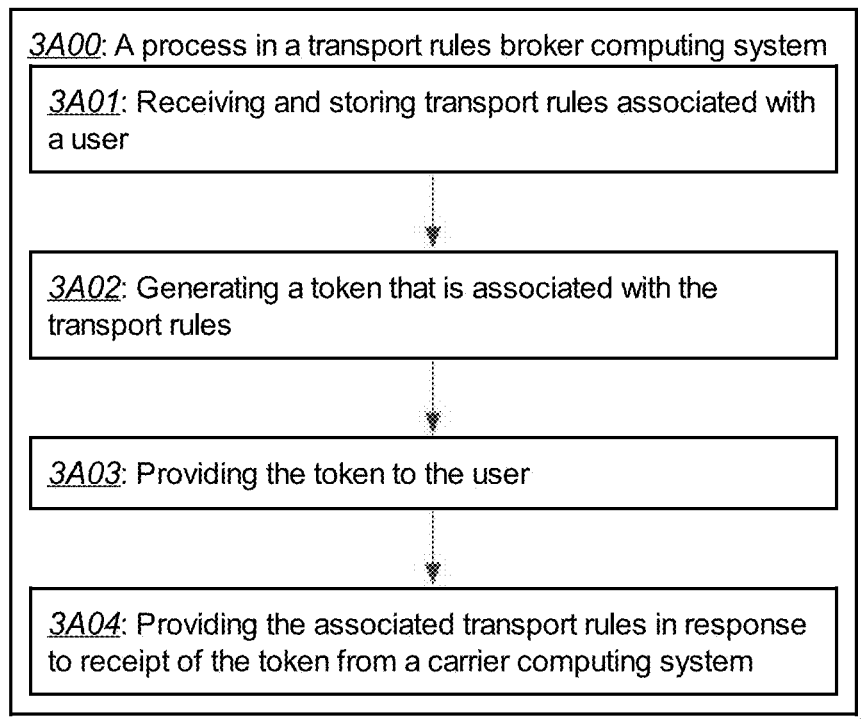

FIG. 3A is a flow diagram of example logic in a transport rules broker computing system. The illustrated logic in this and the following flow diagrams may be performed by, for example, the transport rules broker computing system 100 described with respect to FIG. 4, below. FIG. 3A illustrates a process 3A00 that includes the following block(s).

Block 3A01 includes receiving and storing transport rules associated with a user, wherein the transport rules control one or more operations performed by a carrier when transporting an item from or to the user. Rules are statements or indications of operations that are to be performed in the course of transporting an item to a user. Rules may also specify data values that are to be collected, possibly to prove or otherwise indicate that the operation underlying the rule has been executed. These data values may include indications of dates, times, locations (e.g., GPS coordinates), photographs, temperature, or the like.

Block 3A02 includes generating a token that is associated with the transport rules. Different types of tokens may be generated by the process. Some tokens may be unique to the user, and can be later transmitted (e.g., by a carrier computing system) to the transport rules broker computing system along with a request to look up the specific rule set associated with the token/user. In other cases, the token directly encodes the rule, such as by specifying a hold at location operation, a time of delivery operation, or the like.

Block 3A03 includes providing the token to the user or other entity or device, thereby causing the user to provide the token to a merchant computing system via a computer-implemented input control that includes a field that is configured to receive shipment data. After the token is generated, it is provided to the user, who stores it in some manner, such as in a password wallet, personal file, or the like. Later, the user provides the token to the merchant computing system as part of a shipping transaction, such as when the user makes an online purchase. Typically, the user provides the token via an field in a shipping destination address form or similar. In other embodiments, the token may be provided to the merchant as part of a communication protocol that connects a mobile e-commerce app with the merchant computing system.

Block 3A04 includes providing the associated transport rules in response to receipt of the token from a carrier computing system, thereby causing the carrier to transport the item according to the transport rules. The carrier computing system may come into possession of the token in various ways. In some cases, the merchant computing system may transmit the token to the carrier computing system when requesting that the carrier transport the item. In other cases, the merchant (or its shipping agent) may pass the item to the carrier in a package that is labeled with the token. The token may then be scanned or otherwise input by the carrier into the carrier computing system. The carrier computing system then transmits the token to the transport rules broker computing system, which answers with the associated transport rules.

FIG. 3B is a flow diagram of example logic illustrating an extension of process 3A00 of FIG. 3A. FIG. 3B illustrates a process 3600 that includes the process 3A00, and which further includes the following block(s).

Block 3601 includes receiving from multiple distinct carriers indications of transport operations that can be performed by each carrier. In some embodiments, the transport rules broker computing system operates independently of multiple distinct carriers. Each carrier can provide the broker with a list, catalog, or other data structure that specifies the transport operations that can be performed by the carrier. The broker then surfaces these operations by way of rules, where each rule is a requirement that one or more of the operations be performed by a specific carrier.

Block 3602 includes presenting multiple transport rules to the user, wherein each transport rule corresponds to a transport operation that can be performed by one of the carriers. A Web page or similar interface may be presented to the user, such that the user can select rules that should control item shipments made to or on behalf of the user. An example user interface is shown and described with respect to FIG. 2A.

Block 3603 includes receiving from the user a selection of one or more of the multiple transport rules. As discussed with reference to FIG. 2A, the user may select one or more rules, such as hold at location, appointment delivery, or the like.

Block 3604 includes storing the selected transport rules in association with the user and the generated token. Once the rules are selected, the process stores the selected rules in persistent storage (e.g., disk, database) in association with the user and the generated token. As discussed above, the token is provided to the user such that the selected rules can be later accessed.

FIG. 3C is a flow diagram of example logic illustrating an extension of process 3A00 of FIG. 3A. FIG. 3C illustrates a process 3C00 that includes the process 3A00, wherein the providing the token to the user includes the following block(s).

Block 3C01 includes causing the user to input the token via an address field of the input control, wherein the token includes a valid address that is not the destination address of the item. The token may be or include an address (or portion thereof) that is entered into an address field of the input form. When the address field is processed by the merchant computing system for address verification purposes, it appears to be a valid address, even though it is not the actual destination address. Further down the line, the carrier may recognize the address as a token and use it to interact with the transport rules broker computing system in order to determine the actual destination address and any associated transport rules for the user. The token may be a street address, post office box, postal code or the like that is not actually associated with a physical location but has been registered with address verification systems by the transport rules broker computing system. In other embodiments, the token may be entered into a name field of the input control, in which case the token may be the user's name combined with an identifier that specifies or otherwise identifies the transport rules.

FIG. 3D is a flow diagram of example logic illustrating an extension of process 3A00 of FIG. 3A. FIG. 3D illustrates a process 3D00 that includes the process 3A00, and which further includes the following block(s).

Block 3D01 includes enforcing the rule by receiving an indication that the rule has been executed by receiving the token along with a data item required by the rule. As noted above, the rule may require that one or more data items be provided or sub-rules be executed in the course of execution of the underlying rule operation. As one example, a rule may require a delivery driver to deliver an item to the recipient's car. To show that this delivery has been completed, the rule may further require that the driver provide a photograph of the car. In this case, the delivery driver will provide a photograph of the car as part of performing the rule operation. This photograph is transmitted to the process along with the token to verify that the rule operation has been completed. As another example a rule may require delivery to a drop box. The rule may further require that the token be transmitted by the drop box to the transport rules broker computing system along with a date and time.

FIG. 3E is a flow diagram of example logic illustrating an extension of process 3A00 of FIG. 3A. FIG. 3E illustrates a process 3E00 that includes the process 3A00, and which further includes the following block(s).

Block 3E01 includes receiving from a mobile device an indication that the token has been presented to a party to the transport of the item. In some embodiments, a rules may require that the token be presented to a party to the transport of the item. This party may be a person who takes delivery of the package, a person who receives a package at a shipping store, a delivery driver, or the like. Presenting the token may serve to authenticate one party to another during the transport of the item. For example, a delivery driver may present the token to a receptionist, who will accept the delivery provided the token is authentic and associated with a recipient known to the receptionist. The receptionist may use a mobile device to scan or otherwise input the token and then transmit the token to the transport rules broker computing system.

Block 3E02 includes transmitting to the mobile device an indication that the token is authentic. The process determines the authenticity for example by looking the token up in it token storage. If the token is found, it is authentic. If not, the process transmits an indication of authentication failure to the mobile device.

FIG. 3F is a flow diagram of example logic illustrating an extension of process 3E00 of FIG. 3E. FIG. 3F illustrates a process 3F00 that includes the process 3E00, and which further includes the following block(s).

Block 3F01 includes receiving from the mobile device an identifier of the user. The process may also determine whether a particular token is associated with the user. In this embodiment, the mobile device transmits a user identifier to the process, which determines whether the token is associated with the user.

Block 3F02 includes transmitting to the mobile device an indication that the token is associated with the user. The process replies (when appropriate) that the token is associated with the user. Note that in other embodiments, different parties may be linked to the token and/or a particular rule. For example, a rule may require authentication of a designated recipient who is not the same person as the user.

Figure 3G:
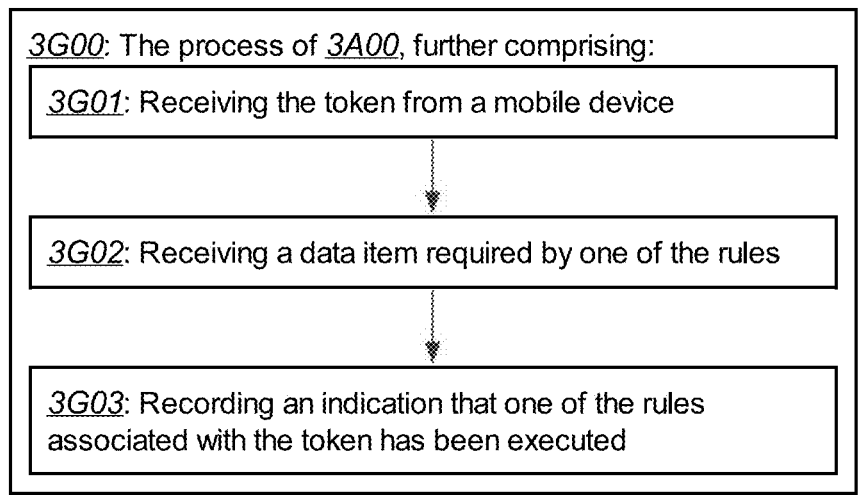

FIG. 3G is a flow diagram of example logic illustrating an extension of process 3A00 of FIG. 3A. FIG. 3G illustrates a process 3G00 that includes the process 3A00, and which further includes the following block(s).

Block 3G01 includes receiving the token from a mobile device. The mobile device may be operated by a recipient, delivery driver, or the like.

Block 3G02 includes receiving a data item required by one of the rules. The data item can be any data item required by a rule, such as a picture of a package at a particular location, GPS data that specifies the location of the mobile device, a signature, date, time, or the like.

Block 3G03 includes recording an indication that one of the rules associated with the token has been executed. The indication may be recorded in a tamper-resistant manner, so as to provide a verifiable audit trail reflecting the transport and delivery of an item.

In some embodiments, the token is electronic and has a haptic or an audio or visual component or representation. In such embodiments, the token may be presented to and understood by sensory-impaired persons.

3. Example Computing System Implementation

Figure 4:
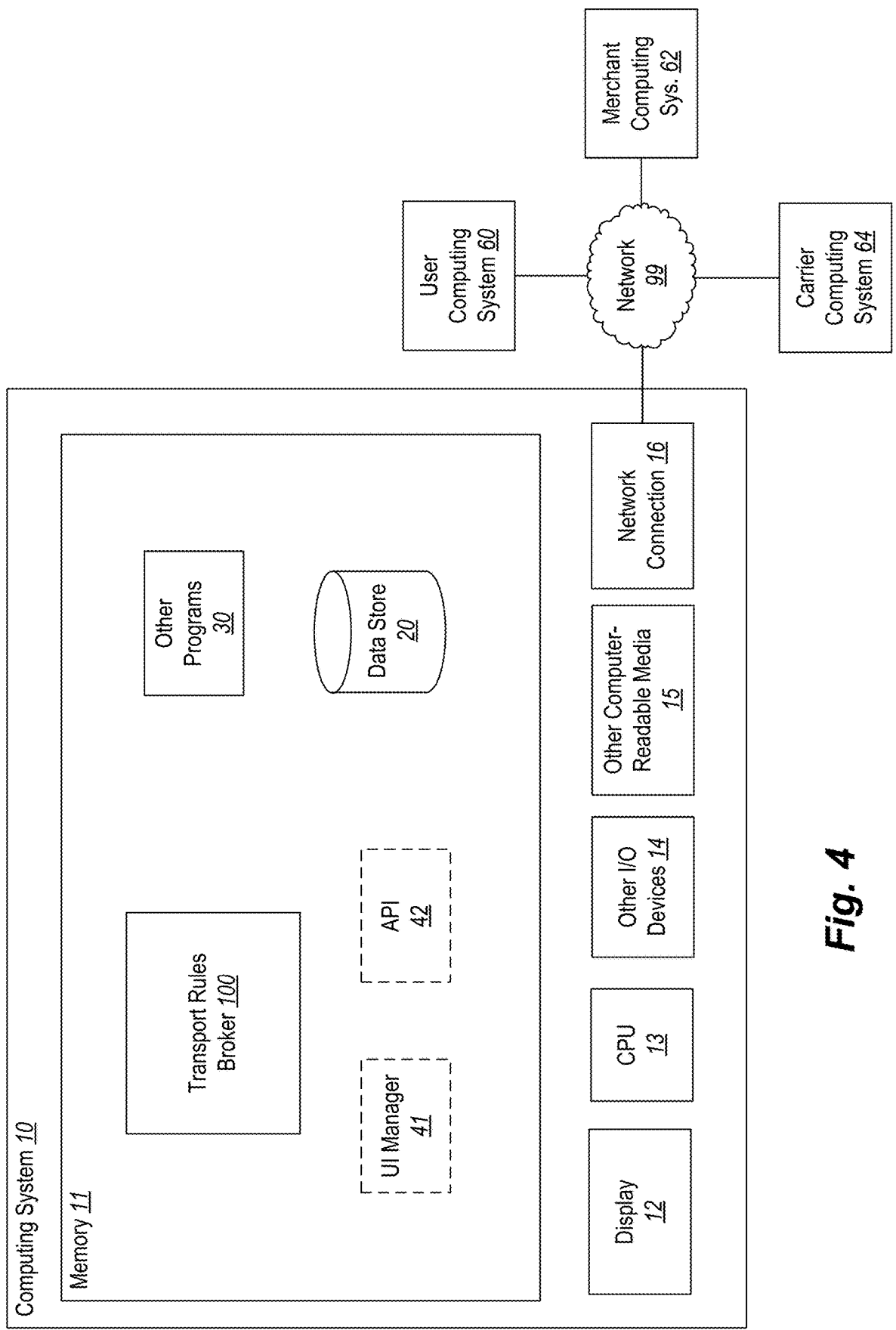
FIG. 4 is a block diagram of an example computing system or device for implementing a transport rules broker according to an example embodiment.

FIG. 4 is a block diagram of an example computing system or device for implementing a transport rules broker according to an example embodiment. In particular, FIG. 4 shows a computing system 10 that executes a transport rules broker 100 that implements at least some of the techniques described herein.

Note that one or more general purpose or special purpose computing systems/devices may be used to implement and/or execute the broker 100. However, just because it is possible to implement the broker 100 on a general purpose computing system does not mean that the techniques themselves or the operations (taken alone or in combination) required to implement the techniques are conventional or well known. The techniques are not conventional at least because they address and improve an existing technology, such as by improving the operation, integration, or efficiency of one or more computing systems.

The computing system 10 may comprise one or more distinct computing systems/devices and may span distributed locations. Furthermore, each block shown may represent one or more such blocks as appropriate to a specific embodiment or may be combined with other blocks. Also, the broker 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and a network connection 16. The broker 100 is shown residing in memory 11. In other embodiments, some portion of the contents, some or all of the components of the broker 100 may be stored on and/or transmitted over the other computer-readable media 15. The broker 100 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 7 may not be present in any specific implementation. For example, some embodiments may not provide other computer readable media 15 or a display 12.

The broker 100 interacts using network connection 16 via a network 99 with other devices/systems including user computing system 60, merchant computing system 62, and carrier computing system 64. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

The broker 100 is shown executing in the memory 11 of the device 100. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the broker 100.

The UI manager 41 provides a view and a controller that facilitate user interaction with the broker 100 and its various components. For example, the UI manager 41 may provide interactive access to the broker 100, such that users or administrators can interact with the broker 100, such as by setting up user accounts, selecting transport rules, viewing logs, or the like. In some embodiments, access to the functionality of the UI manager 41 may be provided via a Web server, possibly executing as one of the other programs 30. In such embodiments, a user operating a Web browser executing on the user computing system 60 can interact with the broker 100 via the UI manager 41.

The API 42 provides programmatic access to one or more functions of the broker 100. For example, the API 42 may provide a programmatic interface to one or more functions of the broker 100 that may be invoked by one of the other programs 30 or some other module. In this manner, the API 42 facilitates the development of third-party software, such as user interfaces, plug-ins, adapters (e.g., for integrating functions of the broker 100 into Web applications), and the like.

In addition, the API 42 may be in at least some embodiments invoked or otherwise accessed via remote entities, such as code executing on the carrier computing system 64. For example, the carrier computing system 64 may provide a catalog of transport rules to the broker via the API 42. As another example, the system 64 can use the API 42 to obtain a set of transport rules that are associated with a particular token.

In an example embodiment, components/modules of the broker 100 are implemented using software programming techniques. For example, the broker 100 may be implemented as a "native" executable running on the CPU 13, along with one or more static or dynamic libraries. In other embodiments, the broker 100 may be implemented as instructions processed by a virtual machine that executes as one of the other programs 30. In general, a range of programming languages may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the broker 100, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like), or WebSockets. Other variations are possible. Also, other functionality could be provided by each component/module, or existing functionality could be distributed amongst the components/modules in different ways, yet still achieve the functions described herein.

Furthermore, in some embodiments, some or all of the components of the broker 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure.

The invention claimed is:

1. A method in a transport rules system comprising a broker computing system, a merchant computing system, a carrier computing system, a user computing system, and a mobile device, the method comprising:

under control of the broker computing system,
receiving and storing transport rules associated with a user, wherein the transport rules control one or more operations performed by a carrier when transporting an item from or to the user;
generating a token that is associated with the transport rules, wherein the token includes an address that is not a destination address for the item, wherein the included address is registered in an address verification database so that the merchant computing system will not characterize the included address as an invalid address; and transmitting the token to the user computing system;

under control of the merchant computing system, receiving the token via a computer-implemented user interface input control of the merchant computing system that includes a field that is configured to receive shipment data, wherein the merchant computing system is distinct from the broker computing system;

determining that the address included in the token is a valid address, and transmitting the token to the carrier computing system;

under control of the broker computing system, receiving the token from the carrier computing system, the token having been previously transmitted from the merchant computing system to the carrier computing system;

determining, based on the received token, the destination address for the item;

transmitting the associated transport rules and the destination address to the carrier computing system in response to receiving the token from the carrier computing system, thereby causing the carrier to transport the item to the destination address according to the transport rules; and authenticating the transport of the item, by:

receiving from the mobile device an indication that the token has been received by the mobile device, wherein the mobile device is operated by a party engaged in the transport of the item; and transmitting to the mobile device an indication that the token is authentic.

2. The method of claim 1, wherein generating the token that is associated with the transport rules includes: generating a token that is unique to the user.

3. The method of claim 1, further comprising:

under control of the broker computing system, receiving from multiple distinct carriers indications of transport operations that can be performed by each carrier;

presenting multiple transport rules to the user, wherein each transport rule corresponds to a transport operation that can be performed by one of the carriers;

receiving from the user a selection of one or more of the multiple transport rules; and storing the selected transport rules in association with the user and the generated token.

4. The method of claim 1, wherein the receiving the token via the user interface input control includes: receiving the token via an address field of the input control, wherein the token includes a valid address that is not a physical destination address of the item.

5. The method of claim 1, wherein the receiving the token via the user interface input control includes: receiving the token via a name field of the input control, wherein the token includes the name of the user and data that specifies the transport rules.

6. The method of claim 1, further comprising: enforcing one of the transport rules by receiving an indication that the one transport rule has been executed by receiving the token along with a data item required by the one transport rule.

7. The method of claim 1, further comprising:

under control of the broker computing system, receiving from the mobile device an identifier of the user; and transmitting to the mobile device an indication that the token is associated with the user.

8. The method of claim 1, further comprising:

under control of the broker computing system, receiving the token from a mobile device;

receiving a data item required by one of the rules; and recording an indication that one of the rules associated with the token has been executed.

9. A system, the system comprising:

a transport rules broker computing system that executes instructions configured to:

receive and store transport rules associated with a user, wherein the transport rules control one or more operations performed by a carrier when transporting an item from or to the user;

generate a token that is associated with the transport rules and that is unique to the user, wherein the token includes an address that is not a destination address for the item, wherein the included address is registered in an address verification database so that the merchant computing system will not characterize the included address as an invalid address;

transmitting the token to a user computing system; and provide the associated transport rules in response to receipt of the token from a carrier computing system;

a merchant computing system that is distinct from the transport rules broker computing system and that executes instructions configured to:

provide a computer-implemented user interface input control that includes a field that is configured to receive shipment data;

receive the token via the input control;

determine that the address included in the token is a valid address; and transmit the token to a carrier computing system; and a first carrier computing system that is controlled by an entity that does not control the transport rules broker computing system, and that executes instructions configured to:

transmit the token to the transport rules broker computing system;

obtain, from the transport rules broker computing system, the associated transport rules; and transport an item to the user according to the associated transport rules, wherein the transport rules broker computing system is further configured to:

receive the token from the first carrier computing system, the token having been previously transmitted from the merchant computing system to the first carrier computing system;

determine, based on the received token, the destination address for the item;

transmit the associated transport rules and the destination address to the first carrier computing system in response to receiving the token from the carrier computing system, thereby causing the carrier to transport the item to the destination address according to the transport rules; and authenticate the transport of the item, by:

receiving from the mobile device an indication that the token has been received by the mobile device, wherein the mobile device is operated by a party engaged in the transport of the item; and transmitting to the mobile device an indication that the token is authentic.

10. The system of claim 9, wherein the transport rules broker computing system is further configured to:
receive from multiple distinct carriers indications of transport operations that can be performed by each carrier;
present multiple transport rules to the user, wherein each transport rule corresponds to a transport operation that can be performed by one of the carriers;
receive from the user a selection of one or more of the multiple transport rules; and
store the selected transport rules in association with the user.

11. The system of claim 9, wherein the transport rules include: an instruction that controls transport of the item, and wherein the transport rules broker computing system is configured to enforce the rule by receiving and recording an indication that the rule has been executed.

12. The system of claim 9, further comprising:
a mobile device that executes instructions configured to:
receive an indication that the token has been presented to a party to the transport of transmit the received indication to the transport rules broker computing system; and
receive from the transport rules broker computing system an indication that the token is authentic.

13. The system of claim 12, wherein the mobile device is further configured to::
transmit to the transport rules broker computing system an identifier of the user; and
receive from the transport rules broker computing system an indication that the token is associated with the user.

14. The system of claim 9, wherein the transport rules include: an instruction that controls delivery of the item, including an instruction to: hold the item at a specified location, deliver the item to a storage locker, deliver the item to an automobile, deliver to a workplace, deliver the item to a neighbor, or deliver the item at a specified time or day.

15. The system of claim 9, wherein the merchant computing system is further configured to: receive the token via an address field of the input control, wherein the token is a valid address that is not the destination address of the item.

16. The system of claim 9, wherein the merchant computing system is further configured to: receive the token via a field of the input control, wherein the token includes an address item that is not associated with a physical location, wherein the address item is a postal code, post office box, or street address.

17. One or more non-transitory computer-readable media including contents that are configured, when executed, to cause a transport rules system comprising a broker computing system, a merchant computing system, a carrier computing system, a user computing system, and a mobile device to perform a method comprising:
under control of the broker computing system,
receiving and storing transport rules associated with a user, wherein the transport rules control one or more operations performed by a carrier when transporting an item from or to the user;
generating a token that is associated with the transport rules, wherein the token includes an address that is not a destination address for the item, wherein the included address is registered in an address verification database so that the merchant computing system will not characterize the included address as an invalid address; and
transmitting the token to the user computing system;
under control of the merchant computing system,
receiving the token via a computer-implemented user interface input control of the merchant computing system that includes a field that is configured to receive shipment data, wherein the merchant computing system is distinct from the broker computing system;
determining that the address included in the token is a valid address, and
transmitting the token to the carrier computing system;
under control of the broker computing system,
receiving the token from the carrier computing system, the token having been previously transmitted from the merchant computing system to the carrier computing system;
determining, based on the received token, the destination address for the item;
transmitting the associated transport rules and the destination address to the carrier computing system in response to receiving the token from the carrier computing system, thereby causing the carrier to transport the item to the destination address according to the transport rules; and
authenticating the transport of the item, by:
receiving from the mobile device an indication that the token has been received by the mobile device, wherein the mobile device is operated by a party engaged in the transport of the item; and
transmitting to the mobile device an indication that the token is authentic.

18. The method of claim 1, further comprising:
under control of the broker computing system,
providing a transport rules selection screen comprising a rules selection input control and a token display control;
receiving via the transport rules selection control the transport rules associated with the user;
displaying via the token display control one or more tokens that include the generated token.

19. The method of claim 18, wherein the displayed one or more tokens include:
a first token that is a code that directly identifies the transport rules associated with the user and that does not identify the user;
a second token that is a string that contains a name of the user with a code that identifies the transport rules associated with the user; and
a third token that is a string that includes a street address that is not a physical destination address of the item.

20. The method of claim 1, further comprising:
under control of the broker computing system,
receiving a GPS location from the mobile device, wherein the transport rules include a rule that requires the mobile device to transmit a GPS location at one or more times during transport of the item; and
recording in a tamper resistant manner an indication that the rule that requires the mobile device to transmit a GPS location has been executed.

* * * * *